United States Patent
Wease et al.

(10) Patent No.: US 10,693,650 B2
(45) Date of Patent: Jun. 23, 2020

(54) BIOMETRIC IDENTITY VERIFICATION SYSTEMS, METHODS AND PROGRAMS FOR IDENTITY DOCUMENT APPLICATIONS AND RENEWALS

(71) Applicant: MASTERCARD INTERNATIONAL INCORPORATED, Purchase, NY (US)

(72) Inventors: Matthew Wease, St. Louis, MO (US); Regan E. Harmon, O'Fallon, MO (US); William Raymond Bowie, Lake St. Louis, MO (US); Christopher T. Scholl, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 366 days.

(21) Appl. No.: 15/847,280

(22) Filed: Dec. 19, 2017

(65) Prior Publication Data

US 2019/0190718 A1    Jun. 20, 2019

(51) Int. Cl.
*H04L 29/06* (2006.01)
*H04L 9/32* (2006.01)
*G06K 9/00* (2006.01)

(52) U.S. Cl.
CPC .......... *H04L 9/3231* (2013.01); *H04L 9/3242* (2013.01); *H04L 9/3247* (2013.01); *H04L 63/0442* (2013.01); *H04L 63/0861* (2013.01); *G06K 9/00087* (2013.01); *G06K 9/00288* (2013.01); *G06K 9/00617* (2013.01); *H04L 63/0272* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 6,085,976 A  *  | 7/2000 | Sehr | G06Q 10/02 235/384 |
| 6,565,000 B2 | 5/2003 | Sehr | |
| 7,558,965 B2 | 7/2009 | Wheeler | |
| 7,690,032 B1 * | 3/2010 | Peirce | G06F 21/32 380/229 |

(Continued)

FOREIGN PATENT DOCUMENTS

| | | |
|---|---|---|
| WO | 2004019154 A2 | 3/2004 |
| WO | 2013148552 A1 | 10/2013 |
| WO | 2017142407 A1 | 8/2017 |

*Primary Examiner* — Shin-Hon (Eric) Chen
(74) *Attorney, Agent, or Firm* — Armstrong Teasdale LLP (57) ABSTRACT

An automated identity verification computing device, system and method receives an encrypted renewal request from a user computing device including a biometric value, a digital passport object identifier, and request data. The computing device, system and method retrieves trusted biometric data based on the digital passport object identifier from an identity database, determine a verification score based on the trusted biometric data and the biometric value, and generates a renewal package including the verification score, the digital passport object identifier, and the request data. The computing device, system and method transmits the renewal package to a sponsoring authority computing device.

21 Claims, 6 Drawing Sheets

(56) References Cited

U.S. PATENT DOCUMENTS

| | | | | |
|---|---|---|---|---|
| 7,950,577 | B1* | 5/2011 | Daniel | G06Q 10/02 |
| | | | | 235/380 |
| 8,074,878 | B1* | 12/2011 | Daniel | G06K 19/07 |
| | | | | 235/380 |
| 8,458,465 | B1* | 6/2013 | Stern | G06F 21/32 |
| | | | | 713/166 |
| 8,878,645 | B2 | 11/2014 | Sweatte | |
| 9,406,067 | B1* | 8/2016 | Robinson | G06Q 20/40145 |
| 9,876,803 | B2* | 1/2018 | Miu | H04L 63/126 |
| 10,255,419 | B1* | 4/2019 | Kragh | H04L 9/3247 |
| 2002/0112177 | A1 | 8/2002 | Voltmer | |
| 2003/0140233 | A1* | 7/2003 | Samar | G07C 9/257 |
| | | | | 713/186 |
| 2004/0003295 | A1* | 1/2004 | Elderfield | G07C 9/257 |
| | | | | 713/176 |
| 2004/0100363 | A1* | 5/2004 | Lane | G06K 19/025 |
| | | | | 340/5.86 |
| 2004/0162984 | A1* | 8/2004 | Freeman | G06Q 20/40145 |
| | | | | 713/175 |
| 2005/0084139 | A1* | 4/2005 | Kyle | G06K 9/00973 |
| | | | | 382/115 |
| 2006/0159312 | A1 | 7/2006 | Chiang | |
| 2008/0082452 | A1* | 4/2008 | Wankmueller | G06Q 20/04 |
| | | | | 705/67 |
| 2008/0209516 | A1* | 8/2008 | Nassiri | G06F 21/32 |
| | | | | 726/3 |
| 2012/0116918 | A1* | 5/2012 | Andersson | G06Q 20/02 |
| | | | | 705/26.41 |
| 2015/0095352 | A1* | 4/2015 | Lacey | G06F 21/316 |
| | | | | 707/752 |
| 2015/0128240 | A1* | 5/2015 | Richards | H04L 63/0861 |
| | | | | 726/7 |
| 2015/0317466 | A1* | 11/2015 | Kumar | G06F 21/32 |
| | | | | 726/7 |
| 2016/0072979 | A1* | 3/2016 | Feraud | G07C 9/253 |
| | | | | 382/100 |
| 2016/0148039 | A1 | 5/2016 | Potash | |
| 2016/0219046 | A1 | 7/2016 | Ballard | |
| 2017/0111175 | A1* | 4/2017 | Oberhauser | H04L 9/3236 |
| 2017/0317997 | A1* | 11/2017 | Smith | H04L 9/0891 |
| 2018/0189583 | A1* | 7/2018 | Wohlken | G06K 9/00604 |

* cited by examiner

FIG. 6

BIOMETRIC IDENTITY VERIFICATION SYSTEMS, METHODS AND PROGRAMS FOR IDENTITY DOCUMENT APPLICATIONS AND RENEWALS

BACKGROUND

This disclosure relates generally to identity verification systems for the processing of identity document applications, and more specifically to electronic identity verification systems for biometric authentication of digital passport renewals.

Identity documents, such as passports books and passport cards, are government issued objects available for use by international and domestic travelers at security checkpoints, but are also widely accepted as a form of identification for non-travel purposes. Passport documents are generally considered to be more secure than other forms of identification because of the rigorous application and review requirements to obtain a passport. Digital passports, also known as electronic passports, e-passports, or ePassports are now available that include an embedded electronic microprocessor chip which contains biometric information that can be used to authenticate the identity of the passport holder.

At present, the applicant identity authentication in the processing of identity document application is inefficient in some aspects and challenging in others with respect to biometric information. Improvements are desired.

BRIEF DESCRIPTION

In one aspect, the disclosure describes an identity verification computing device for processing an identity document application. The identity verification computing device includes one or more processors in communication with one or more memory devices and being configured to receive an encrypted identity document request from a user computing device including a biometric value, an identity document object identifier, and request data. The identity verification computing device is also configured to retrieve trusted biometric data based on the identity document object identifier from an identity database; determine a verification score based on the trusted biometric data and the biometric value; and generate a data package including the verification score, the digital passport object identifier, and the request data. The identity verification computing device is further configured to transmit the data package to a sponsoring authority computing device.

In another aspect, the disclosure provides a method of identity verification for processing an identity document application is provided. The method may include an identity verification computing device having one or more processors in communication with one or more memory devices. The method includes receiving an encrypted identity document request from a user computing device with the identity verification computing device. The encrypted identity document request including a biometric value, an identity document object identifier, and request data. The method also includes retrieving trusted biometric data based on the identity document object identifier from an identity database; determining a verification score based on the trusted biometric data and the biometric value; and generating a data package including the verification score, the digital passport object identifier, and the request data. The method also includes transmitting the data package to a sponsoring authority computing device.

In another aspect, the disclosure provides a non-transitory computer readable medium that includes computer executable instructions for electronically verifying an identity of an identity document applicant. When executed by at least one host computing device having at least one processor in communication with a memory device, the computer executable instructions cause the at least one host computing device to receive an encrypted identity document request from a user computing device including a biometric value, an identity document object identifier, and request data. The computer executable instructions cause the at least one host computing device to: retrieve trusted biometric data based on the identity document object identifier from an identity database; determine a verification score based on the trusted biometric data and the biometric value; and generate a data package including the verification score, the digital passport object identifier, and the request data. The computer executable instructions further cause the at least one host computing device to transmit the data package to a sponsoring authority computing device.

DETAILED DESCRIPTION

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

Digital passports are enhanced security documents issued by the applicable passport issuing authority, and include international standards for securing and storing information relating to the passport and the passport bearer that must be met. Such digital passports issued by Visa Waiver Program (VWP) countries and the United States also have security features to prevent the unauthorized reading or "skimming" of data stored on the e-Passport chip. Digital passports accordingly provide certain security benefits that are needed to protect the privacy interests of the passport bearer. Consequently, digital passports are being increasingly adopted around the world by passport issuing authorities. Indeed, the United States now issues all passports (either in passport books or passport cards) with digital passport features.

The rather extensive processing associated with passport applications and renewal applications for existing passports is conventionally slow and cumbersome, at least in part because of the required high level of applicant identity authentication. Considering a United States passport, once the identity of the applicant is sufficiently authenticated and the remaining requirements are met the passport is issued for ten years, after which it may be renewed for another ten year period. At the time of initial application or at the time of a renewal application, little biometric data may exist for comparison purposes to authenticate the identity of the applicant. At the time of passport renewal, existing systems to evaluate fingerprints, facial features, or retinal scans of an applicant and compare to the biometric data stored on a digital passport are very slow to process a high number of renewal applicants.

Biometric authentication systems are in widespread use in other applications such as those associated with mobile devices. For example, digital wallet services exist that require authentication of a payment card transaction using a fingerprint and/or a facial geometry scan, where trusted biometric data may be stored by a mobile device and used to verify the transaction as being made by payment card holder. The biometric data utilized in digital wallet services provides potential to improve the processing of passport applications as they provide an independent data source for biometric data comparisons.

Trusted biometric data used to perform payment card transactions may in some aspects be considered more reliable than other data due to the frequency that the biometric data is used in digital wallet services. Improvements in passport applications, in terms of speed and reliability, are possible in view of biometric payment card data that have not yet been realized.

The systems and methods of the disclosure allow flexible identity verification to process a digital identity document (e.g., a passport) application, renewal, or augmentation. Such identity verification may be particularly advantageous for a sponsoring authority processing digital passport renewals, where the sponsoring authority may not have direct access to trusted biometric data for the applicant. The identity verification systems and methods described herein may be extended to original passport applications as well since similar needs to authenticate biometric data exists, as well as to other identity documents such as, but not necessarily limited to, driver's licenses, visas, residence permits, and the other identity documents issued in various forms that may desirably include biometric data features and processing.

Renewing a digital passport after an extended period of time (e.g., ten years after its issuance) may require substantial documentation and/or application information to achieve the enhanced security and identity fraud or theft prevention measures desired. However, while updated application information may not be stored by the sponsoring authority, in at least some aspects, current applicant information is available in a digital format from sources such as user mobile devices, digital wallet service providers, identity databases, and the like. Processing time for renewing identity documents may be reduced due to automated verification of application information using identity databases that incorporate biometric usage data from external sources, including but not necessarily limited to digital wallet services performed on mobile device to complete payment by card transactions with biometric authentication of a card holder making the transaction.

An identity verification system is provided to augment the process of applying for or renewing identity documents such as passports. In certain embodiments, the identity verification system is configured to receive encrypted renewal requests, and to generate verification scores based on an identity database, before transmitting an updated renewal package to a sponsoring authority associated with issuing identity documents. In other words, an identity verification system is provided to process biometric data included in renewal requests before final processing by a sponsoring authority.

The systems and methods of the disclosure facilitate authenticating an identity document (e.g., passport renewal) using an identity verification Computing Device. The identity verification computing device is configured to receive renewal requests including biometric data. The identity verification computing device is configured to verify the biometric data using an identity database including at least one external source of biometric data (e.g., payment card digital wallet service data), and generate a verification score. The identity verification computing device is further configured to generate an updated renewal package, including the verification score, and transmit the updated renewal package to the sponsoring authority (e.g., a passport office/issuing authority or third party acting on behalf of a passport issuing authority).

Advantageously, the systems and methods of the disclosure allow enhanced authentication of renewal requests. The identity verification computing device reduces processing time associated with renewal requests, by electronically verifying the renewal request using biometric data, and generating the verification score. For example, renewal requests determined to have a high verification score may require less manual processing and verification using additional information. The identity verification computing device is configured to aggregate identity data (e.g., trusted biometric data) from any number of identity databases. In one embodiment, the identity verification computing device is be connected to an identity database associated with the sponsoring authority (e.g., passport office), and also any number of additional identity databases associated with payment networks, identity verification services, government authorities, and the like. For example, the identity verification computing device may be connected to a sponsoring authority identity database storing trusted biometric data from previous renewal requests, and a payment network identity database storing trusted biometric data associated with payment accounts and payment transactions completed using payment cards and digital wallet services. In other words, errors in digital identity documents may be reduced by aggregating trusted identity data from at least one, if not multiple systems and biometric data sources that otherwise operate outside the systems of the sponsoring authority.

In one example embodiment, a user requests a passport renewal using a mobile device including a digital wallet service application. The digital wallet application is associated with a payment network, and is configured to capture biometric data using a scanning component of the mobile device. The mobile device, via the digital wallet application, may accordingly generate a passport renewal request including biometric data, and a digital passport object identifier that corresponds to other data used by the digital wallet application or otherwise known to the digital wallet application (e.g., name, residential address, date of birth) via enrollment to the digital wallet services. In certain embodiments, the digital wallet application is configured to encrypt the renewal request using key data stored in a secure memory component, and transmit the renewal request to the identity verification computing device.

The identity verification computing device is configured to receive the renewal request, and to query an identity database based on the biometric data in the request. The identity database is associated with the payment network for the digital wallet services, and includes trusted biometric data used to authenticate payment card transactions. The identity verification computing device generates a verification score based at least in part on comparing the received biometric data to the trusted biometric data, and generates an updated renewal package including the verification score. For example, the identity verification computing device may include a high verification score when the retrieved biometric data matches the trusted biometric data.

The identity verification computing device is further configured to transmit the updated renewal package to a sponsoring authority (e.g., license office, passport office). In the example embodiment, the sponsoring authority determines to approve or deny the renewal request based on the verification score. In some embodiments, the sponsoring authority approves renewal requests including verification scores meeting a threshold, and generates an approval message. In one embodiment, a sponsoring authority computing device is configured to generate an approval message including an updated digital passport object, and transmit the approval message to the identity verification computing device.

In the example embodiment, the identity verification system includes a user computing device, such as a smartphone or tablet. In certain embodiments, the user computing device includes a digital wallet application, storing any combination of digital passport objects, identity documents, virtual payment cards, and the like. In some embodiments, the user computing device includes a secure memory component storing public and/or private key data, such as Advanced Encryption Standard (AES), Rivest-Shamir-Adleman (RSA), or Data Encryption Standard (DES) key data. In one embodiment, the secure memory component is programmed during device assembly. In another embodiment, the secure memory component is configured such that memory segments may not be arbitrarily written to or read from. In other words, the data stored within the secure memory component may not be arbitrarily modified. The user computing device includes a processor configured to encrypt data based on key data stored in the secure memory component. For example, the processor may be configured to encrypt a renewal package before transmitting it to the network.

In some embodiments, the user computing device includes a scanning component, configured to generate representations of biometric factors. For example, a user computing device may include a fingerprint reader configured to generate a numerical representation of the fingerprint. In another example, the user computing device may include a camera system configured to generate a numerical representation of facial geometry. Such a numerical representation of the fingerprint or a numerical representation of facial geometry may be provided by the user device as a biometric data value in a passport renewal request. The biometric data value can, in turn, be compared to biometric values of external sources such as digital wallet services.

The identity verification system includes an identity verification computing device. The identity verification computing device is in communication with the user computing device. In certain embodiments, the identity verification computing device includes a secure memory component storing public and/or private key data. For example, the secure memory component may store a private component of a RSA key. The identity verification computing device includes a processor configured to decrypt data based on key data stored in the secure memory component. For example, an encrypted packet may be received over a network interface, and the identity verification computing device may decrypt the packet. The identity verification computing device is in communication with at least one identity database. In some embodiments, the identity database stores trusted biometric data indexed using passport identifiers, such as passport numbers. For example, the identity database may include biometric data stored in a location associated with passport identifiers.

The identity verification computing device is communicatively coupled to a sponsoring authority computing device. In certain embodiments, the identity verification computing device is connected to the sponsoring authority computing device using a virtual network connection, such as a Virtual Private Network (VPN) connection. Additionally or alternatively, the identity verification computing device may be connected to the sponsoring authority computing device using the same network as the user computing device. The sponsoring authority computing device is in communication with a digital passport database storing digital passport data, such as passport expiration dates, renewal history, validity data, and the like.

The user computing device is configured to generate an identity document (e.g., passport) renewal request. In some embodiments, where the user computing device further includes a digital wallet application, the renewal request is generated based on digital passport information stored in or otherwise made known to the digital wallet application. For example, the user computing device may generate a passport renewal request based on a digital passport object six months before the expiration date. The user computing device may provide an interactive application to generate such renewal requests. For example, the application may be configured to prompt a user for request data such as a digital passport object (e.g., a passport number), passport expiration date, mailing address of the passport bearer, and the like, and to generate a renewal reminder in a desired form (e.g., SMS text, email, push notification or other form of notification). In reply to the reminder, the user may initiate an automated renewal request without requiring manual re-entry of information and possible human error.

More specifically, the user computing device is configured to generate the renewal request, including a biometric value, a digital passport object, and request data. The renewal request is encrypted, such that the renewal request is included in an encrypted package. In the example embodiment, the renewal request is encrypted based on key data stored in the secure memory component. In certain embodiments, the renewal request is encrypted using a first portion of an asymmetric key, such that the renewal request may be decrypted using a second portion of the asymmetric key stored by the identity verification computing device. In some embodiments, the user computing device is configured to transmit the encrypted package, including the renewal request, to the identity verification computing device using a data network such as the internet. Additionally or alternatively, the user computing device may be configured to transmit the encrypted package to a sponsoring authority computing device. In certain embodiments, the identity verification computing device is configured to provide a secure virtual connection to the user computing device, such as a VPN connection.

The identity verification computing device is configured to receive the encrypted request package from the user device and process the request in an automated manner while eliminating human error. Additionally or alternatively, the identity verification computing device may receive the encrypted request package from the sponsoring authority computing device. In other words, the sponsoring authority computing device may route the encrypted request package to the identity verification computing device for authentication processing. In certain embodiments, any combination of data networks, payment networks, cellular networks, authentication networks, and the like may be used to route the encrypted package to the identity verification computing device.

The identity verification computing device is configured to decrypt the encrypted request package. In the example embodiment, the identity verification computing device decrypts the encrypted package using encryption key data stored in a secure memory component. More specifically, the encrypted package may be decrypted using a second portion (e.g., private portion) of an asymmetric key. The identity verification computing device decrypts the encrypted request package as the renewal request.

The identity verification computing device is configured to query at least one identity database with the biometric value included in the renewal request, where the query is configured to retrieve trusted biometric data. In one embodiment, where the biometric value includes a partial representation of a fingerprint, the trusted biometric data may include a fingerprint representation. In another embodiment, where the biometric value includes a representation of facial geometry, the trusted biometric data may include a facial geometry model. In certain embodiments, the identity verification computing device is configured to generate a SQL query, including a digital passport number, configured to select trusted fingerprint data, and transmit the SQL query to the identity database. The SQL query includes instructions to operate the identity database, such that the database transmits the data responsive to the query to the identity verification computing device.

In an alternate embodiment, the identity verification computing device is configured to query the identity database with the digital passport object identifier included in the renewal request. In yet another embodiment, the identity verification computing device is configured to query the identity database using any combination of the request data. For example, the identity verification computing device may retrieve trusted biometric data using a social security number. In certain embodiments, the identity verification computing device is configured to determine a biometric profile identifier based on the request data, and retrieve trusted biometric data based on the profile identifier. For example, the identity verification computing device may determine a biometric profile identifier based on a name and birthdate from a renewal request.

The identity verification computing device is configured to receive trusted biometric data (e.g., a trusted biometric value) from the identity database. The identity verification computing device is further configured to generate a verification score based on the biometric value and the trusted biometric data. In some embodiments, where the trusted biometric value includes hashed value generated based on a fingerprint scan, the identity verification computing device is configured to compare the hashed value to a trusted hashed value stored in the database. In another embodiment, the trusted biometric value includes a representation of features identified in the fingerprint scan, and the identity verification computing device is configured to generate the verification score based on matching the identified features from the biometric value to a trusted fingerprint image stored in the identity database. For example, each matched fingerprint feature may increase the resulting verification score. In yet another embodiment, the biometric value includes facial geometry data, and the identity verification computing device is configured to compare the facial geometry data to trusted facial geometry data stored in the identity database. For example, a low error margin between the received facial geometry data (e.g., biometric value) and the trusted facial geometry data (e.g., trusted biometric value) may result in an increased verification score.

In an alternate embodiment, the biometric value includes an indicator of successful biometric authentication, where the biometric authentication was performed at the user device. In one embodiment, the biometric value indicating biometric authentication from the user device is encrypted using a first portion of an encryption key, and the trusted biometric data includes a second portion of the encryption key. In other words, identity verification computing device may be configured to verify biometric authentication performed at the user device.

In certain embodiments, the identity verification computing device is configured to generate verification scores based on an encrypted indicator that biometric verification was performed on the user computing device, utilizing the secure memory component. In one embodiment, the user computing device is configured to generate biometric data based on facial geometry using a camera system, and to compare the generated biometric data to a trusted facial geometry model stored in a secure memory component. The user computing device may further encrypt an indicator that a facial geometry based biometric authentication was completed, using public key data included in the secure memory component. In other words, the user computing device may perform an on-device biometric authentication, and include a signed (e.g., encrypted, hashed) indicator of the device authentication in the renewal request. In certain embodiments, the user computing device may be configured to scan and compare biometric values based on fingerprint authentication.

The identity verification computing device is configured to generate an updated renewal package, based on the generated verification score and the decrypted renewal request. In the example embodiment, the identity verification computing device receives a renewal request including a biometric value, a digital passport object identifier, and request data (e.g., application information). The identity verification computing device is configured to replace the biometric data from the renewal request with the verification score in the renewal package. In other words, the identity verification computing device receives a renewal request, transforms the renewal request by processing the included biometric data, and retransmits the renewal request as a renewal package to the sponsoring authority. For example, the generated renewal package may include the digital passport object identifier and the request data from the renewal request, but preprocesses the biometric value into a verification score to reduce processing time at the sponsoring authority. When the biometric value has been frequently used to validate digital wallet payment card transactions with success, it serve as a reliable indicator of the applicant's actual identity that may be accepted, or at least considered, by the sponsoring authority to expedite the processing of a renewal application.

In certain embodiments, the identity verification computing device is configured to append a cryptographic signature to the renewal package, based on a hash value of the renewal package, and a key value associated with the sponsoring authority computing device. In one embodiment, the identity verification computing device is configured to hash the renewal package, and encrypt the hash value using a public key associated with the sponsoring authority, such that the sponsoring authority can decrypt the hash value to determine the integrity of the updated renewal package.

The identity verification computing device is configured to transmit the updated renewal package to a sponsoring authority, such as a passport office, where the updated renewal package includes a verification score. In certain embodiments, the sponsoring authority electronically processes the renewal packaged based on the verification score and request data included in the updated renewal package. In one embodiment, where the updated renewal package includes a passport renewal request, a sponsoring authority device is configured to generate an updated digital passport object when the verification score exceeds a security threshold. For example, the sponsoring authority may automatically transmit an updated (e.g., renewed) digital passport object to the identity verification computing device and/or user computer device based on an updated renewal package, without requiring user-intensive review of the renewal package based on the verification score.

In some embodiments, the sponsoring authority is configured to further process renewal requests based on a verification score falling below a security threshold. For example, the sponsoring authority may redirect verification resources to applications where the identity verification computing device determined a low verification score, increasing security while reducing redundant manual verification of requests.

In some embodiments, the sponsoring authority computing device is configured to generate an updated (e.g., renewed) digital passport object, and transmit the digital passport object to the user computing device identified in the renewal package. For example, the renewal package may include a device identifier and/or a digital wallet identifier. In one embodiment, a sponsoring authority computing device transmits an updated digital passport object to the user computing device identified the renewal package, where the user computing device is configured to store the digital passport object in a digital wallet application. In other embodiments, the sponsoring authority computing device transmits an approval indicator to the identity verification computing device, where the identity verification computing device generates the updated digital passport object. For example, the identity verification computing device may generate updated digital passport objects based on the approval indicator and the renewal package, and transmit the digital passport object to the user computing device associated with the request.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment the disclosure provides an identity verification computing device for processing an identity document application. The identity verification computing device includes one or more processors in communication with one or more memory devices and being configured to receive an encrypted identity document request from a user computing device including a biometric value, an identity document object identifier, and request data. The identity verification computing device is also configured to retrieve trusted biometric data based on the identity document object identifier from an identity database; determine a verification score based on the trusted biometric data and the biometric value; and generate a data package including the verification score, the digital passport object identifier, and the request data. The identity verification computing device is further configured to transmit the data package to a sponsoring authority computing device.

The identity verification computing device may further be configured to append a cryptographic signature to the data package, based on a hash value of the data package and a key value associated with the sponsoring authority computing device. The identity verification computing device may also be configured to: determine a biometric profile identifier based on the request data; and retrieve trusted biometric data based on the biometric profile identifier. The trusted biometric data comprises biometric data associated with a payment card system. The biometric value may include a hash value of a fingerprint image, and the trusted biometric data includes the fingerprint image.

The biometric value may include an indicator of successful biometric authentication encrypted with a first portion of an encryption key, and the trusted biometric data includes a second portion of the encryption key. The encrypted identity document request may be encrypted using a public portion of an encryption key associated with the identity verification computing device. The encrypted identity document request is encrypted using a private portion of an encryption key associated with the user computing device.

The user computing device includes a digital wallet application, and the identity verification computing device may be configured to retrieve trusted biometric data received from a payment card system associated with the digital wallet application. The identity document may be a digital passport renewal. The identity verification computing device may be a server system.

In another embodiment of the disclosure, a method of identity verification for processing an identity document application is provided. The method may include an identity verification computing device having one or more processors in communication with one or more memory devices. The method includes receiving an encrypted identity document request from a user computing device with the identity verification computing device. The encrypted identity document request including a biometric value, an identity document object identifier, and request data. The method also includes retrieving trusted biometric data based on the identity document object identifier from an identity database; determining a verification score based on the trusted biometric data and the biometric value; and generating a data package including the verification score, the digital passport object identifier, and the request data. The method also includes transmitting the data package to a sponsoring authority computing device.

The method may also include appending a cryptographic signature to the data package, based on a hash value of the data package and a key value associated with the sponsoring authority computing device. The method may likewise include: determining a biometric profile identifier based on the request data; and retrieving trusted biometric data based on the biometric profile identifier. Retrieving trusted biometric data may include retrieving biometric data associated with a payment card system. Receiving an encrypted identity document request from a user computing device may include a hash value of a fingerprint image.

The biometric value may include an indicator of successful biometric authentication encrypted with a first portion of an encryption key, and the trusted biometric data includes a second portion of the encryption key. The encrypted identity document request may be encrypted using a public portion of an encryption key associated with the identity verification computing device. The encrypted identity document request may also be encrypted using a private portion of an encryption key associated with the user computing device.

The user computing device includes a digital wallet application, and retrieving trusted biometric data may include retrieving biometric data generated by a payment card system associated with the digital wallet application. Receiving an encrypted identity document request may include receiving a digital passport renewal request. The identity verification computing device may be a server system receiving trusted biometric usage data from a digital wallet payment card system, determining a verification score based on the trusted biometric data and the biometric value may include evaluating a frequency of successful authentication of the biometric usage data by the digital wallet payment card system.

In another embodiment of the disclosure, a non-transitory computer readable medium that includes computer executable instructions for electronically verifying an identity of an identity document applicant. When executed by at least one host computing device having at least one processor in communication with a memory device, the computer executable instructions cause the at least one host computing device to receive an encrypted identity document request from a user computing device including a biometric value, an identity document object identifier, and request data. The computer executable instructions cause the at least one host computing device to: retrieve trusted biometric data based on the identity document object identifier from an identity database; determine a verification score based on the trusted biometric data and the biometric value; and generate a data package including the verification score, the digital passport object identifier, and the request data. The computer executable instructions further cause the at least one host computing device to transmit the data package to a sponsoring authority computing device.

The identity document request may be a digital passport renewal request. The trusted biometric data may be generated by a digital wallet application payment card system.

The technical problems addressed by the computing systems and methods of the disclosure include at least one of: (i) inefficiencies in performing biometric verification of an applicant in a request for an identity document; (ii) inability to avoid human error in applying for or processing an application of an identity document; (iii) inability to efficiently process applications for identity documents; (iv) inability to approve applications for identity documents in a desired timeframe; (v) inability to manage privacy concerns in applications for identity documents; (vi) inability to expeditiously verify an applicant's identity in an identity document request when limited biometric data is available; (vii) inability to approve digital passport requests across a large number of applicants in a reduce timeframe and with reduced burden to sponsoring authorities; and (viii) avoidance of inconvenience to the applicant in completing a document identity request such as a digital passport renewal request.

The computing systems and methods of the disclosure may be implemented using computer programming or engineering techniques including computer software, firmware, hardware, or any combination or subset thereof, wherein the technical effects may be achieved by: (i) implementing identity verification processing on a non-sponsoring authority device for improved processing efficiency; (ii) avoiding human error in applying for or processing an application of an identity document by utilizing existing data on computing devices rather than manually completed application forms; (iii) reducing processing times for identity document applications substantially by performing identity verification independently from sponsoring authority systems; (iv) more effectively accommodating a desired timeframe of an applicant in processing a request for identity document; (v) effectively managing privacy concerns in applications for identity documents with secure communication and encryption techniques in the processing of an application for an identity document; (vi) expeditiously verifying an applicant's identity in an identity document request by consulting biometric data from external sources to the sponsoring authority; (vii) reducing burdens to sponsoring authorities to review and approve digital passport requests across a large number of applicants applying for an identity document at the same time; and (viii) eliminating an inconvenience to the applicant in gathering information and manually completing a document identity request such as a digital passport renewal request.

The resulting technical benefits achieved by the payment card processing systems and methods include at least one of: (i) improved processing efficiency of requests for identity documents; (ii) minimal human error in applying for or processing an application of an identity document by utilizing existing data on computing devices rather than manually completed application forms; (iii) reduced processing times for identity document applications substantially by performing identity verification independently from sponsoring authority systems; (iv) accommodation of shorter timeframes desired by an applicant to receive approval of a request for identity document; (v) management if privacy concerns in applications for identity documents with secure communication and encryption techniques in the processing of an application for an identity document; (vi) expedited verification of an applicant's identity in an identity document request by consulting biometric data from external sources to the sponsoring authority; (vii) reduced burden to sponsoring authorities and sponsoring authority systems to review and approve digital passport requests across a large number of applicants applying for an identity document at the same time; and (viii) improved convenience to the applicant by avoiding a need to gather information and manually complete a document identity request such as a digital passport renewal request.

In one embodiment, a computer program is provided, and the program is embodied on a computer-readable medium and utilizes a Structured Query Language (SQL) database with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

Figure 1:
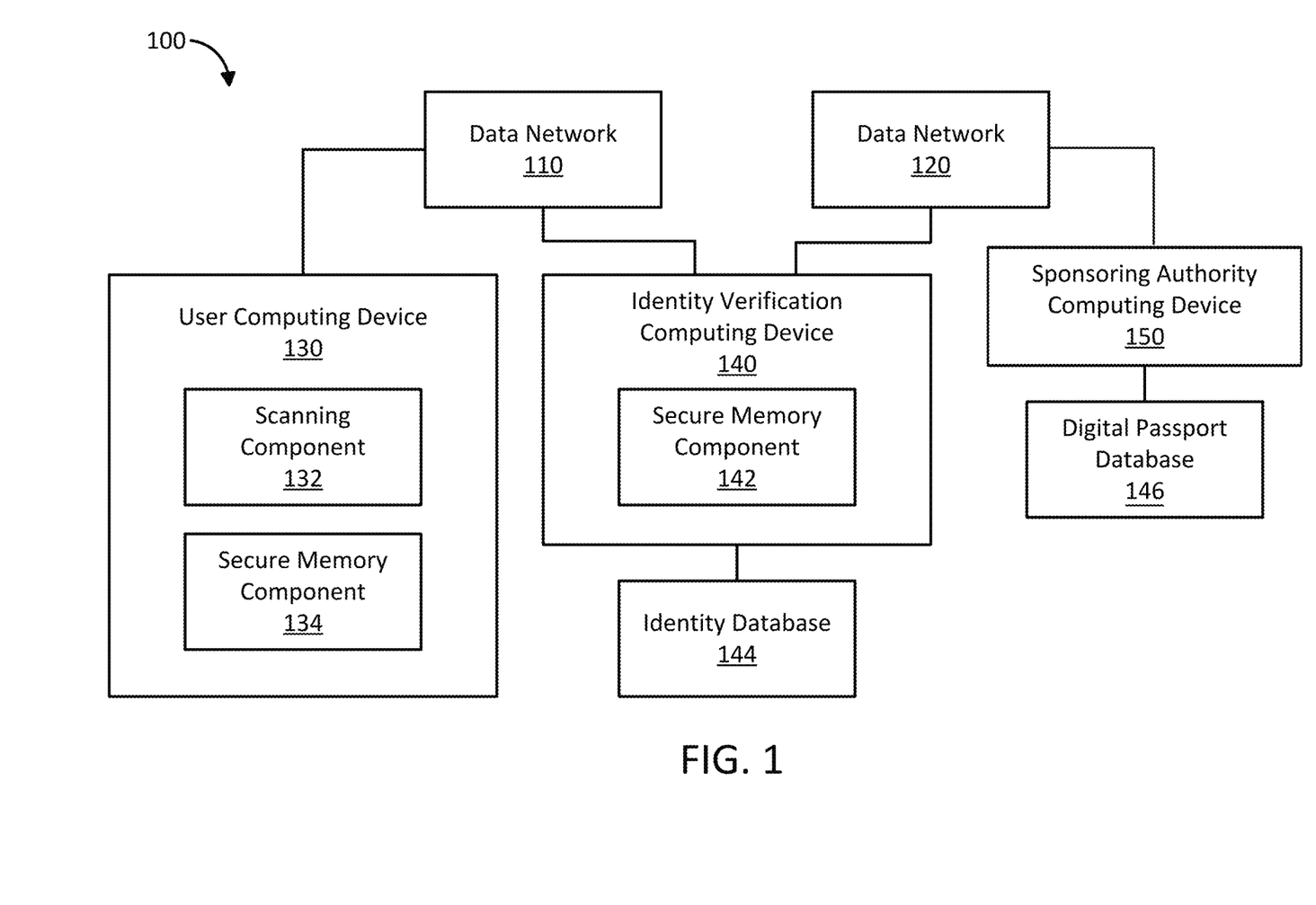
FIG. 1 is a schematic diagram illustrating an exemplary identity verification system for verifying identity document renewal requests.

FIG. 1 is a schematic diagram illustrating an identity verification system 100 for verifying identity document applications or renewal application requests. In the example embodiment, user computing device 130 includes a smartphone, tablet, mobile device, and the like. Specifically, user computing device 130 includes a scanning component 132 configured to capture biometric data. Biometric data, as used herein, is generated based on biometric scanning on features such as face geometry, fingerprints, vein patterns, and retinal patterns. User computing device 130 is configured to process scanned biometric data into a biometric value, such as a digital representation of the biometric feature (e.g., fingerprint, retinal pattern). In some embodiments, the biometric value may be hashed and/or reduced to a partial representation of the feature.

User computing device 130 includes secure memory component 134. In certain embodiments, secure memory component 134 includes trusted biometric data, such as a trusted biometric value. In one embodiment, user computing device 130 is configured to compare biometric values generated by scanning component 132 to trust biometric values stored in secure memory component 134.

In certain embodiments, secure memory component 134 is configured to store encryption key data, such as public and/or private encryption keys. For example, an RSA key or an AES key may be stored. User computing device 130 may be further configured to decrypt and encrypt data, such as biometric values, using encryption key data stored in secure memory component 134. In one embodiment, secure memory component 134 stores a public key, where the public key is configured to asymmetrically encrypt data for decryption by a corresponding, yet separate, private key. For example, user computing device 130 may encrypt data with a public key corresponding to a private key stored by identity verification computing device 140. In certain embodiments, secure memory 134 may be functionally read-only to user computing device 130. For example, secure memory component 134 may be pre-programmed before assembly. Additionally or alternatively, secure memory component 134 may have restricted access, such that arbitrary access is not possible. For example, secure memory component 134 may be configured to receive new trusted biometric data, but not to provide read access to the stored trusted biometric data.

Identity verification computing device 130 is communicatively coupled to user computing device 130 using data network 110. In the example embodiment, data network 110 is a TCP/IP network, such as the internet. Data network 110 includes any combination of network interfaces and switching devices. For example, user computing device 130 may be connected to data network 110 using a wireless network interface (e.g., Wi-Fi), and identity verification computing device 140 may be connected to data network 110 using an Ethernet network interface.

In the example embodiment, identity verification computing device 130 includes secure memory component 142 storing encryption key data. For example, secure memory component 142 may store any combination of encryption key data, private key data, and public key data. The encryption key data may include data associated with encryption schemes such as AES, DES, and RSA. In one embodiment, secure memory component 142 includes private key data used to decrypt data messages received from user computing device 130.

Identity verification computing device 140 is communicatively coupled to identity database 144, such that identity verification computing device 140 may query identity database 144 to retrieve stored data. For example, identity verification computing device 140 may transmit an SQL query to identity database 144, where identity database 144 is configured to process the query and return matching data. In the example embodiment, identity database 144 includes trusted biometric data and digital passport object identifiers. For example, identity database 144 may return trusted biometric data when queried with a digital passport object identifier by identity verification computing device 140.

Identity verification computing device 140 is further communicatively coupled to data network 120, including sponsoring authority computing device 150. In the example embodiment, data network 120 is an encrypted virtual private network ("VPN") connection. Data network 120 may also include the internet. In certain embodiments, data network 120 is connected to data network 110. For example, data network 110 and data network 120 may both be the internet.

In a contemplated embodiment, however, data network 120 is a component of a payment network processing payment card transactions using digital wallet features and biometric authentication features. As such, the identity verification computing device is in communication with at least a portion of a payment card transaction processing system and therefore may benefit from biometric data usage of the payment card transaction processing system for purposes of verifying identity of a passport renewal applicant.

Sponsoring authority computing device 150 includes digital passport database 146 storing digital passport renewal data (e.g., expiration dates). In the example embodiment, digital passport database 146 is indexed using digital passport object identifiers.

Figure 2:
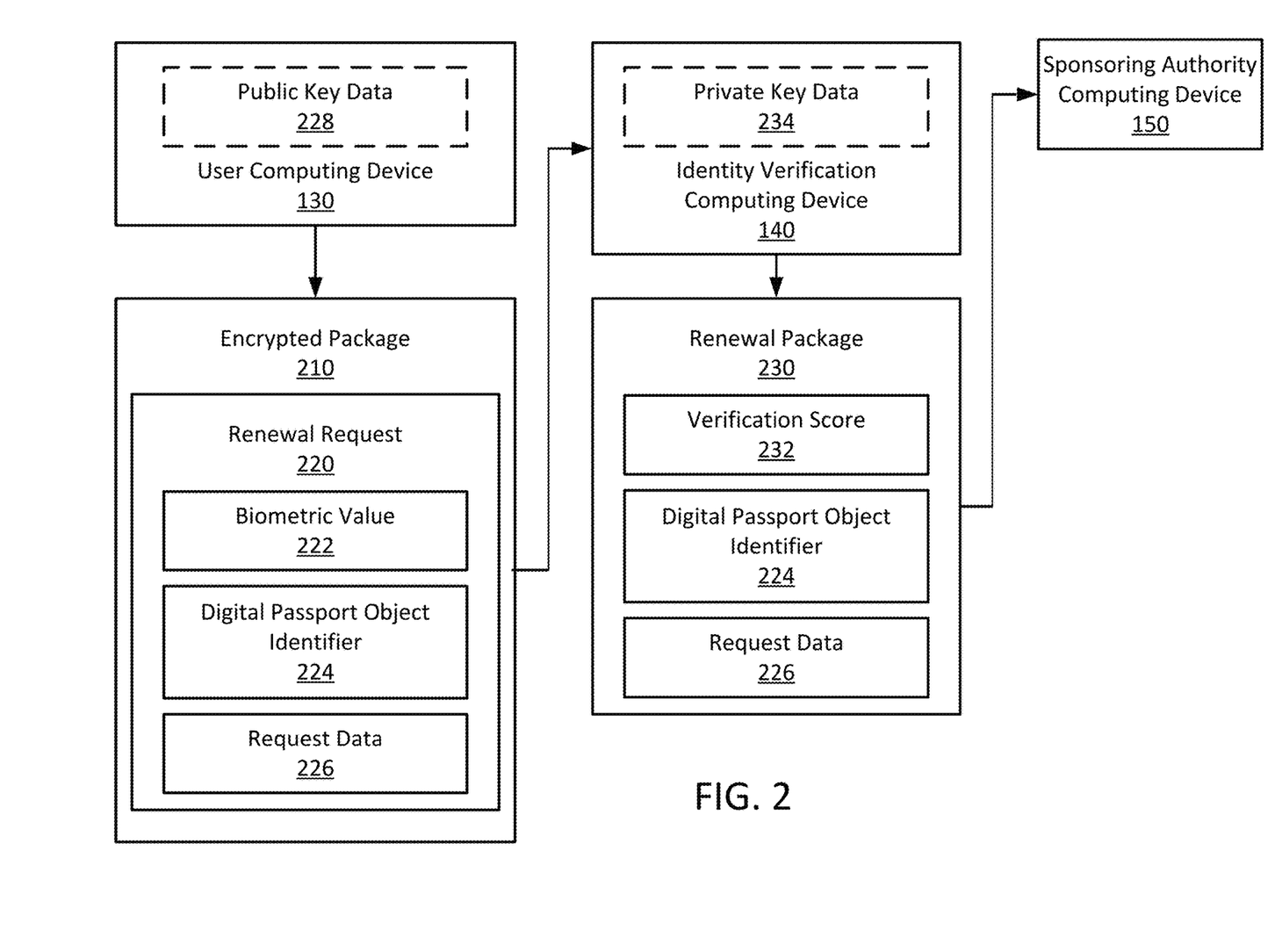
FIG. 2 is a data flow diagram of the system shown in FIG. 1 illustrating verifying identity document renewal requests.

FIG. 2 is a data flow diagram illustrating identity verification system 100. User computing device 130 is configured to generate renewal request 220. In one embodiment, user computing device 130 generates renewal request 220 based on user interaction with a digital wallet application. For example, the digital wallet application may provide a user interface to renew a passport, and to generate renewal request 220 in an automated manner. An application other than a digital wallet application is possible, however, to provide the user interface to make a renewal request and generate the same.

Identity verification computing device 140 is configured to receive encrypted package 210 from user computing device 130. Encrypted package 210 encapsulates renewal request 220. For example, renewal request 220 may be encrypted, hashed, and/or compressed. In the example embodiment, encrypted package 220 is encrypted by user computing device 130 using public key data 228 stored in secure memory component 134 (shown in FIG. 1). In alternate embodiments, public key data 228 is randomly generated when requested. For example, transport security later ("TLS") encryption may be used.

Identity verification computing device 140 is configured to decrypt encrypted package 210 to retrieve renewal request 220. In the example embodiment, encrypted package 210 is decrypted using private key data stored in secure memory component 142 (shown in FIG. 1). Renewal request includes biometric value 222, digital passport object identifier 224, and request data 226, where biometric value 222 was generated by scanning component 132 of user computing device 130. In the example embodiment, digital passport object identifier 224 is associated with a digital passport object for which renewal is being requested. Request data 226 is associated with digital passport object 224, and is intended for sponsoring authority computing device 150. In the example embodiment, request data 226 includes any combination of an applicant name, address, citizenship information, residence information, employment information, travel information, and the like.

Identity verification computing device 140 is configured to generate renewal package 230, including digital passport object identifier 224 and request data 226 from renewal request 220. Renewal package 230 further includes verification score 232, generated by identity verification computing device 140. The generation of verification score 232 is detailed in FIG. 3. Verification score 232 includes any combination of numeric scores and/or verification indicators. For example, verification score 232 may include a score of 75, indicating a moderately high level of verification based on comparing biometric value 222 and/or request data 226 to trusted user data (e.g., digital wallet transaction data or another source of biometric data). In the example embodiment, verification score 232 is generated by identity verification computing device 140 to replace biometric value 222. Additionally or alternatively, renewal package 230 may include biometric value 222.

Identity verification computing device 140 is configured to transmit request package 230 to sponsoring authority computing device 150 using network 120 (shown in FIG. 1). In certain embodiments, sponsoring authority computing device 150 may generate a digital passport object based on renewal package 230, and transmit the digital passport object to identity verification computing device 140 using network 120. In other embodiments, sponsoring authority computing device 150 may transmit an approval indicator to identity verification computing device 140, where identity verification computing device 140 is configured to generate digital passport objects.

Figure 3:
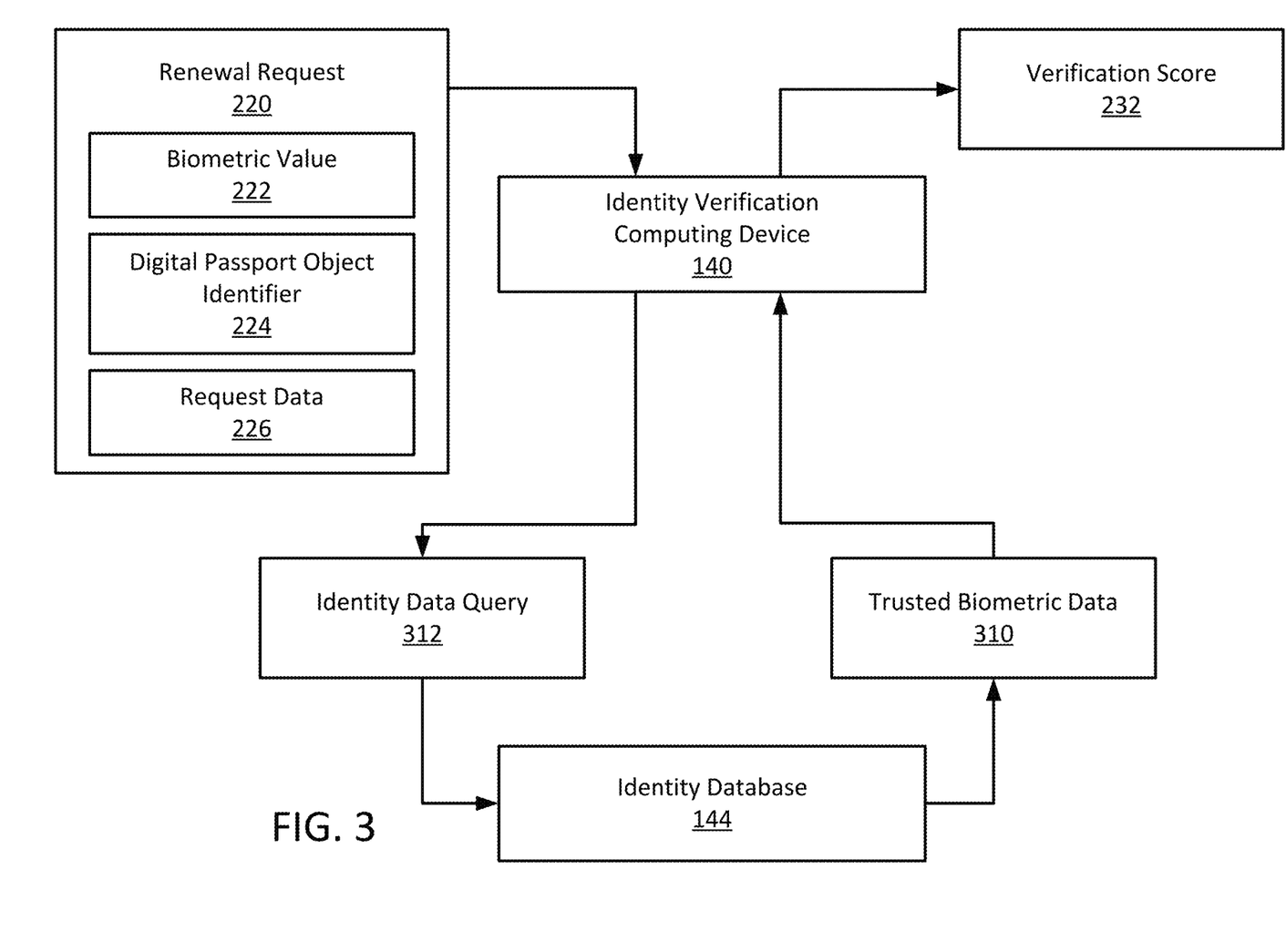
FIG. 3 is a data flow diagram of the system shown in FIG. 1 illustrating determining verification scores.

FIG. 3 is a data flow diagram illustrating identity verification system 100. More specifically, FIG. 3 illustrates generating a verification score based at least in part on trusted biometric data.

Identity verification computing device 140 is configured to generate verification score 232 in response to renewal request 220. In the example embodiment, verification score 232 is generated based on comparing biometric value 222 from renewal request 220 to trusted biometric data 310. For example, a fingerprint image may be compared to trusted fingerprint data. In another example, a hashed facial geometry data may be compared to trusted facial geometry data.

Identity verification computing device 140 is configured to retrieve trusted biometric data 310 from identity database 144, using identity data query 312. In the example embodiment, identity data query 312 is an SQL query configured to select trusted biometric data 310 based on digital passport object identifier 224. For example, trusted fingerprint data associated with the digital passport object may be retrieved by query 312. In certain embodiments, identity data query 312 may include a portion of request data 226. For example, where request data 226 includes a user identifier (e.g., SSN, customer ID, etc.), identity data query 312 may be configured to select trusted biometric data 310 from identity database 144 based on the user identifier.

Identity verification computing device 140 is configured to retrieve trusted biometric data 310 based on identity data query 312. Identity verification computing device 140 is further configured to generate verification score 232 based on comparing trusted biometric data 310 to biometric value 222.

As shown in FIG. 2, renewal request 220 includes biometric value 222, digital passport object identifier 224, and request data 226. In the example embodiment, identity verification computing device 140 is configured to store biometric value 222 in a memory, and transmit digital passport object identifier 224 to identity database 144. Specifically, identity verification computing device 140 may generate a SQL query including digital passport object identifier 224, where the query is configured to retrieve trusted biometric value 310.

In response to retrieving trusted biometric value 310, Identity verification computing device 140 is configured to compare trusted biometric value 310 to biometric value 222. In the example embodiment, verification score 232 is a numerical rating indicating the extent to which renewal request 220 was verified using, at least, trusted biometric data 310 from a separate source such as the digital wallet biometric data. For example, verification score 232 may include a score of 85, indicating a moderately high level of automated verification, such as when biometric value 222 substantially matches trusted biometric data 310 that has been found sufficient to authenticate payment card transactions via a digital wallet. Verification score 232 may also include a score of 25, indicating a lower level of automated verification, such as when biometric value 222 does not substantially match trusted biometric data 310. In alternate embodiments, verification score 232 may include a verification indicator. For example, verification score 232 may include a pass/fail indicator and an identifier of the type of verification performed (e.g., fingerprint verification, facial geometry verification, etc.) The greater the frequency of matches by an external system such as the digital wallet the more reliable the automated verification may become, perhaps eliminating any practical need for further processing or verification.

Figure 4:
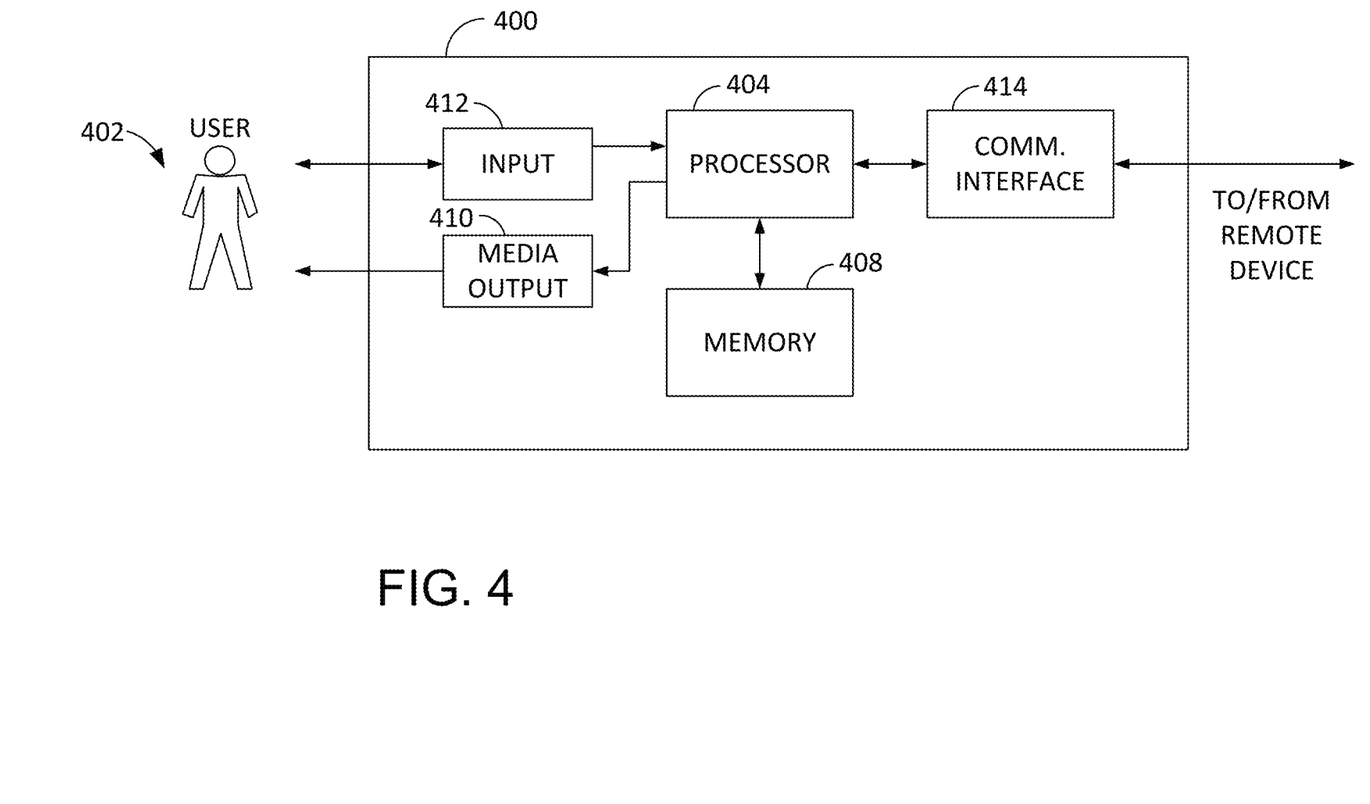
FIG. 4 illustrates an example configuration of a user device for the system and data flows shown in FIGS. 1-3.

FIG. 4 illustrates an example configuration of a device 400 operated by a user 402, such as any of the parties described above. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in a card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
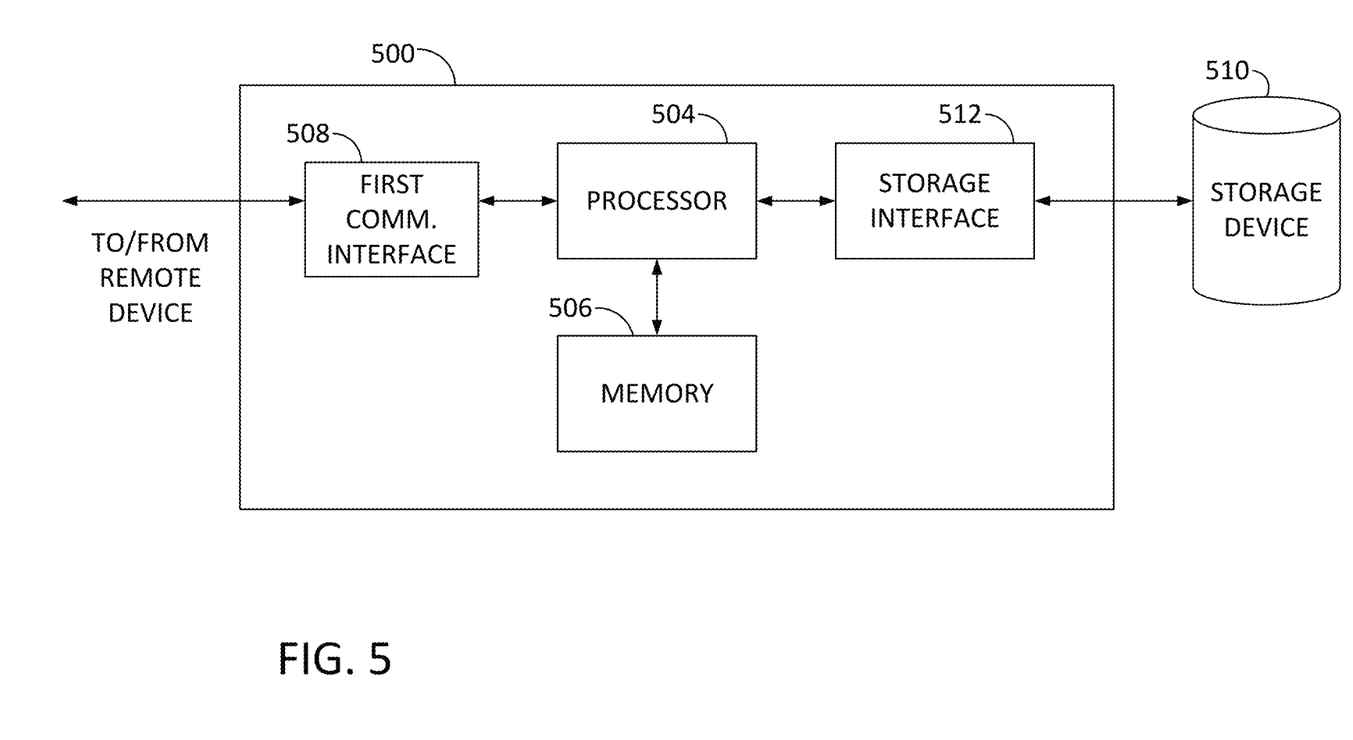
FIG. 5 is a schematic diagram of an example server computing device that maybe used with the computer system shown in FIG. 1.

FIG. 5 illustrates an example configuration of an identity verification computing device 500 as described above. The computing device 500 is sometimes referred to herein as a server-based network "host" device that coordinates and manages identity document renewal requests as described above, although it is not strictly necessary in all embodiments that the host computing device is a server system.

As shown in FIG. 5, the identity verification computing device 500 includes a processor 504 for executing instructions. Instructions may be stored in a memory area 506, for example. Processor 504 may include one or more processing units (e.g., in a multi-core configuration).

Processor 504 is operatively coupled to a communication interface 508 such that identity verification computing device 500 is capable of communicating with a remote device such as a merchant portal, an issuing portal, an electrical provider portal, a delivery agent portal or a payment processor. For example, communication interface 508 may receive or transmit transaction data, enrolled cardholder data, enrolled merchant data, affiliate agreement data, etc. to the cardholder portal, merchant portal, a payment processor, and/or another client device via a network.

Processor 504 may also be operatively coupled to a storage device 510. Storage device 510 is any computer-operated hardware suitable for storing and/or retrieving data. In some embodiments, storage device 510 is integrated in energy transaction host computing device 500. For example, identity verification computing device 500 may include one or more hard disk drives as storage device 510. In other embodiments, storage device 510 is external to identity verification computing device 500 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders, enrolled merchants, and energy credit conversion information and data. In one embodiment, the database is centralized and stored on the identity verification computing device 500. In an alternative embodiment, the database is stored remotely from identity verification computing device 500 and may be non-centralized. The database may store transaction data including data relating to merchants, merchant locations, cardholders, cardholder location, and affiliate fee agreements and accounting.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
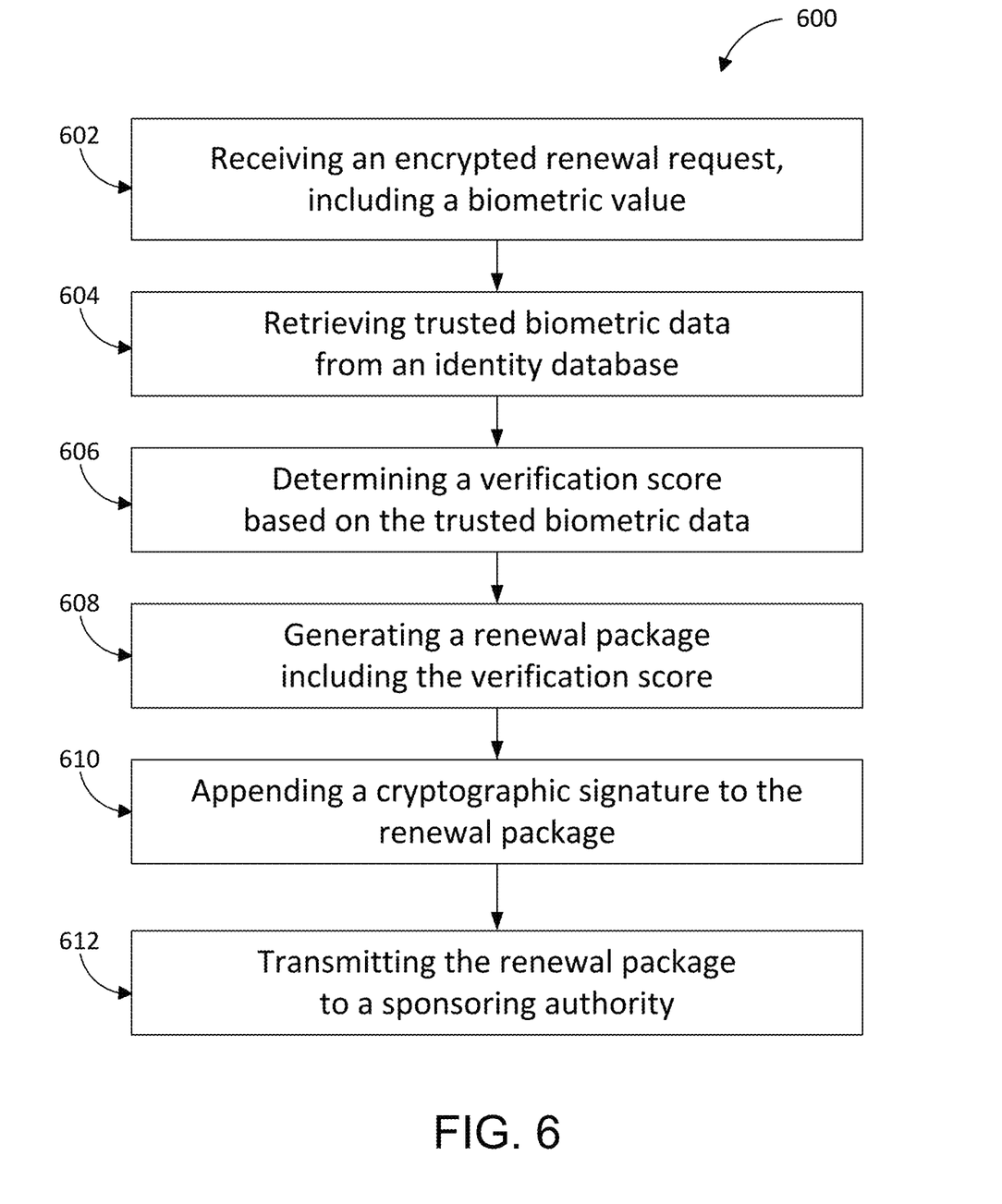
FIG. 6 is a flowchart illustrating an example process of identity verification for the system of FIG. 1.

FIG. 6 is a flowchart illustrating an example process of identity verification in a digital passport renewal using the biometric authentication system of FIG. 1.

At step 602, the identity verification computing device 140 receives an encrypted renewal request, including a biometric value, a digital passport object identifier and request data. For example, the request data may include identity document application data such as a birthdate, legal name, social security number, birthplace, and the like. The encrypted renewal request may be generated by a user device of the applicant or by the sponsoring authority as described above or in another manner as desired. The encrypted renewal request may further be generated by a digital wallet application on the applicant's device or in another manner as desired.

At step 604, the identity verification computing device 140 retrieves trusted biometric data from the identity database 144. In one embodiment, step 604 includes querying the identity database 144 using the digital passport object identifier. In another embodiment, step 604 includes determining a biometric profile identifier based on the digital passport object identifier and/or request data, and querying the identity database based on the biometric profile identifier. The identity database 144 may include trusted biometric data such as biometric usage data from external sources described above, including but not necessarily limited to a digital wallet service application provided on the applicant's mobile device.

At step 606, the identity verification computing device 140 determines a verification score based on comparison of the trusted biometric data and the biometric value included in the encrypted renewal request, and at step 608 the identity verification computing device 140 generates a renewal package including the verification score and sends the renewal package to the sponsoring authority computing device 150 for further action. For example, a higher verification score may be generated in response to determining the biometric value is a close match to the trusted biometric data. Frequency of matching of the biometric value with the trusted data in operation of a digital wallet service (or matched made by another independently operating system) may be factored into the verification score.

In certain embodiments, at step 610 a cryptographic signature is appended to the renewal package based on a hash value of the renewal package and a key value associated with the sponsoring authority computing device. For example, the cryptographic signature may confirm the biometric data was properly validated. The cryptographic signature may be performed by the sponsoring authority computing device 150 or by the identity verification computing device 140.

At step 612 the renewal package is sent by the identity verification computing device 140 to the sponsoring authority computing device 150. In certain embodiments, the sponsoring authority may generate an updated digital passport object, and transmit the updated digital passport object to the user computing device and/or the identity verification computing device.

The process 600 may be performed in a highly reliable, yet automated manner by the computing devices described with optimal efficiency and in a vastly reduced amount of time than conventional identity verification methods for passport renewals. Human error and delay in completing forms and entering data is practically eliminated, and data intensive operations to confirm biometric values by the sponsoring authority may be avoided for a host of applicants in which the verification scores described are sufficiently high in view of trusted biometric data from the external sources.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An identity verification computing device for processing a digital passport application, the identity verification computing device comprising one or more processors in communication with one or more memory devices and being configured to:
   receive an encrypted identity document request from a user computing device including a biometric value, a digital passport object identifier, and request data;
   retrieve trusted biometric data based on the digital passport object identifier from an identity database of a payment card processing system, the trusted biometric data used by the payment card processing system for authenticating payment card transactions;
   determine a verification score based on the trusted biometric data and the biometric value;
   generate a data package including the verification score, the digital passport object identifier, and the request data;
   generate a cryptographic signature for the data package based on a hash value of the data package and a key value associated with a sponsoring authority computing device, wherein the sponsoring authority computing device is separate from the payment card processing system and is associated with a passport issuing authority;
   append the cryptographic signature to the data package; and
   transmit the data package to the sponsoring authority computing device.

2. The identity verification computing device of claim 1, being further configured to:
   determine a biometric profile identifier based on the request data; and
   retrieve trusted biometric data based on the biometric profile identifier.

3. The identity verification computing device of claim 1, wherein the biometric value includes a hash value of a fingerprint image, and the trusted biometric data includes the fingerprint image.

4. The identity verification computing device of claim 1, wherein the biometric value includes an indicator of successful biometric authentication encrypted with a first portion of an encryption key, and the trusted biometric data includes a second portion of the encryption key.

5. The identity verification computing device of claim 1, wherein the encrypted identity document request is encrypted using a public portion of an encryption key associated with the identity verification computing device.

6. The identity verification computing device of claim 1, wherein the encrypted identity document request is encrypted using a private portion of an encryption key associated with the user computing device.

7. The identity verification computing device of claim 1, wherein the user computing device includes a digital wallet application, and wherein the identity verification computing device is configured to retrieve trusted biometric data received from the payment card processing system associated with the digital wallet application.

8. The identity verification computing device of claim 1, wherein the identity document request is a digital passport renewal.

9. The identity verification computing device of claim 1, wherein the identity verification computing device comprises a server system.

10. A method of identity verification for processing a digital passport application, the method including an identity verification computing device having one or more processors in communication with one or more memory devices, the method comprising:
    receiving an encrypted identity document request from a user computing device with the identity verification computing device, the encrypted identity document request including a biometric value, a digital passport object identifier, and request data;
    retrieving trusted biometric data based on the digital passport object identifier from an identity database of a payment card processing system, the trusted biometric data used by the payment card processing system for authenticating payment card transactions;
    determining a verification score based on the trusted biometric data and the biometric value;
    generating a data package including the verification score, the digital passport object identifier, and the request data;
    generating a cryptographic signature for the data package based on a hash value of the data package and a key value associated with a sponsoring authority, wherein the sponsoring authority computing device is separate from the payment card processing system and is associated with a passport issuing authority;
    appending the cryptographic signature to the data package; and
    transmitting the data package to the sponsoring authority computing device.

11. The method of claim 10, further comprising:
    determining a biometric profile identifier based on the request data; and
    retrieving trusted biometric data based on the biometric profile identifier.

12. The method of claim 10, wherein receiving an encrypted identity document request from a user computing device comprises a hash value of a fingerprint image.

13. The method of claim 10, wherein the biometric value includes an indicator of successful biometric authentication encrypted with a first portion of an encryption key, and the trusted biometric data includes a second portion of the encryption key.

14. The method of claim 13, wherein the encrypted identity document request is encrypted using a public portion of an encryption key associated with the identity verification computing device.

15. The method of claim 10, wherein the encrypted identity document request is encrypted using a private portion of an encryption key associated with the user computing device.

16. The method of claim 10, wherein the user computing device includes a digital wallet application, and wherein retrieving trusted biometric data comprises retrieving biometric data generated by the payment card processing system associated with the digital wallet application.

17. The method of claim 10, wherein receiving an encrypted identity document request comprises receiving a digital passport renewal request.

18. The method of claim 17, wherein the identity verification computing device comprises a server system receiving trusted biometric usage data from a digital wallet payment card system, and wherein determining a verification score based on the trusted biometric data and the biometric value comprises evaluating a frequency of successful authentication of the biometric usage data by the digital wallet payment card system.

19. A non-transitory computer readable medium that includes computer executable instructions for electronically verifying an identity of a digital passport applicant, wherein when executed by at least one host computing device having at least one processor in communication with a memory device, the computer executable instructions cause the at least one host computing device to:
   receive an encrypted identity document request from a user computing device including a biometric value, a digital passport object identifier, and request data;
   retrieve trusted biometric data based on the digital passport object identifier from an identity database of a payment card processing system, the trusted biometric data used by the payment card processing system for authenticating payment card transactions;
   determine a verification score based on the trusted biometric data and the biometric value;
   generate a data package including the verification score, the digital passport object identifier, and the request data;
   generate a cryptographic signature for the data package based on a hash value of the data package and a key value associated with a sponsoring authority, wherein the sponsoring authority computing device is separate from the payment card processing system and is associated with a passport issuing authority;
   append the cryptographic signature to the data package; and
   transmit the data package to the sponsoring authority computing device.

20. The non-transitory computer readable medium of claim 19, wherein the identity document request is a digital passport renewal request.

21. The non-transitory computer readable medium of claim 19, wherein the trusted biometric data is generated by a digital wallet application payment card system.

* * * * *